United States Patent [19]
Ichihashi

[11] Patent Number: 6,055,865
[45] Date of Patent: May 2, 2000

[54] SEMICONDUCTOR PRESSURE SENSOR

[75] Inventor: Motomi Ichihashi, Tokyo, Japan

[73] Assignee: Mitsubishi Denki Kabushiki Kaisha, Tokyo, Japan

[21] Appl. No.: 09/292,313

[22] Filed: Apr. 15, 1999

[30] Foreign Application Priority Data

Nov. 26, 1998 [JP] Japan .................................. 10-335749

[51] Int. Cl.[7] ............................. G01L 9/00; G01L 7/08
[52] U.S. Cl. ............................................ 73/754; 73/715
[58] Field of Search ........................ 73/754, 756, 715, 73/724, 725, 726, 727

[56] References Cited

U.S. PATENT DOCUMENTS

| | | | |
|---|---|---|---|
| 4,314,225 | 2/1982 | Tominaga et al. ....................... | 338/4 |
| 4,315,236 | 2/1982 | Tominaga et al. ....................... | 338/4 |
| 4,541,282 | 9/1985 | Auerweck et al. ...................... | 73/715 |
| 5,207,102 | 5/1993 | Takahashi et al. ..................... | 73/727 |
| 5,591,917 | 1/1997 | Takeuchi ................................ | 73/727 |
| 5,614,678 | 3/1997 | Kurtz et al. ............................ | 73/727 |

FOREIGN PATENT DOCUMENTS

| | | |
|---|---|---|
| 64-63832 | 3/1989 | Japan . |
| 2-69630 | 3/1990 | Japan . |

*Primary Examiner*—Benjamin R. Fuller
*Assistant Examiner*—Abdullahi Aw-Musse
*Attorney, Agent, or Firm*—Oblon, Spivak, McClelland, Maier & Neustadt, P.C.

[57] ABSTRACT

A semiconductor pressure sensor having a sensor element including a sensor chip to which pressure from a pressure medium is applied, and a pedestal for supporting the sensor chip. The sensor element is bonded to a subplate at the pedestal, and the subplate is bonded to a main plate. The main plate includes an airtightness holding means for holding an airtight seal between the main plate and a sensor mounting part and disposed where pressure of a pressure medium can be detected.

9 Claims, 3 Drawing Sheets

SEMICONDUCTOR PRESSURE SENSOR

BACKGROUND OF THE INVENTION

1. Field of the Invention

The present invention relates to a semiconductor pressure sensor controlled based on a pressure medium detection signal, and relates more specifically to a semiconductor pressure sensor for use in, for example, an automotive transmission control system.

2. Description of the Related Art

Semiconductor pressure sensors of a type related to the present invention typically detect the pressure of a pressure medium based on the magnitude of distortion in a semiconductor body. Semiconductor pressure sensors of this type are taught, for example, in Japanese Patent Laid-Open Publications Nos. 60-73325 (1985), 62-266429 (1987), and 6-3211 (1994). An exemplary conventional semiconductor pressure sensor related to the present invention is shown in FIG. 4 and FIG. 5 and described below.

This semiconductor pressure sensor 50 has a sensor element 53 comprising silicon single crystal sensor chip 51 and a pedestal 52 on which the sensor chip 51 is affixed, and a plate 54 to which the pedestal 52 of the sensor element 53 is bonded.

The sensor element 53 has an anodically bonded structure with three layers, silicon, glass, and silicon. A diaphragm (not shown in the figures) is formed in the sensor chip 51 by anistropic etching of the silicon. A pressure opening 55 is also formed through the plate 54 and pedestal 52 so that pressure from the pressure medium passes through this pressure opening 55 and is applied to the diaphragm.

A pressure medium detection signal detected by the sensor chip 51 is passed to a level adjustment circuit board 56 for adjustment and amplification to a level required for system processing. The level adjustment circuit board 56 is mounted on the plate 54, and is connected to the sensor chip 51 by wire 57.

The semiconductor pressure sensor 50 is mounted as described below to a mounting part 59 provided at a particular pressure detection point of a system-side body 58. More specifically, the plate 54 of the semiconductor pressure sensor 50 is fit to the mounting part 59, and a lip 61 around the edge of the mounting part 59 is crimped to the plate 54, thereby fixing the plate 54 in the mounting part 59. A system circuit board 62 mounted on the system-side body 58 is connected to the level adjustment circuit board 56 by wire 63.

Because the sensor element 53 of this semiconductor pressure sensor 50 is directly connected to the plate 54, thermal stress from the system-side body 58 on the sensor element 53 passes the plate 54 and is applied directly to the pedestal 52 of the sensor element 53. This means that much thermal stress is applied from the system-side body 58 to the sensor element 53 in this exemplary conventional semiconductor pressure sensor 50.

Furthermore, the inside wall of the support member supporting the outside edge of the diaphragm is formed at an angle to the bonding surface of the sensor chip 51 and pedestal 52 because the diaphragm of the sensor chip 51 is formed by anistropic etching.

When thermal stress is repeatedly applied from the system-side body 58 to a conventional semiconductor pressure sensor 50 thus comprised, stress concentration repeatedly develops in particular areas, such as the middle of each side of the rectangular diaphragm part of the sensor chip 51, and the bond between the sensor chip 51 and pedestal 52. Such stress concentration reduces the strength of the sensor chip 51, and lowers the pressure resistance.

As noted above, this conventional semiconductor pressure sensor 50 is mounted to the mounting part 59 by fitting plate 54 to the mounting part 59 of system-side body 58, and crimping the lip 61 around the mounting part 59 to the plate 54. It is therefore difficult to maintain an airtight seal between the plate 54 and lip 61 in a conventional semiconductor pressure sensor 50 thus comprised. As a result, part of the pressure applied to the sensor chip 51 of the sensor element 53 escapes between the system-side body 58 and plate 54 from the lip 61, and the accuracy of pressure detection by the sensor element 53 therefore drops.

SUMMARY OF THE INVENTION

It is therefore an object of the present invention to provide a semiconductor pressure sensor featuring excellent pressure resistance even after repeated exposure to thermal stress, high resistance to failure at high pressure levels, and excellent pressure detection accuracy.

To achieve the above object, a semiconductor pressure sensor according to the present invention has a sensor element comprising a sensor chip to which pressure from a pressure medium is applied, and a pedestal for supporting the sensor chip, bonded to a main plate with a subplate therebetween. An airtight seal is formed and maintained between the main plate and a sensor mounting part disposed where pressure of a pressure medium can be detected by means of an airtightness holding means disposed between the main plate and the sensor mounting part. The subplate in this configuration buffers thermal stress from the sensor mounting part to the sensor chip. The airtightness holding means prevents-leakage of the pressure medium from between the main plate and sensor mounting part.

The airtightness holding means is preferably an O-ring fit to fill a gap between an outside wall in the thickness direction of the main plate, and a surface of the sensor mounting part opposite said outside wall. In addition to holding an airtight seal between the main plate and sensor mounting part, an O-ring absorbs external forces applied from the sensor mounting part to the sensor element through the main plate and subplate.

The pedestal is preferably formed by anodically bonding a glass layer between first and second silicon layers in a three-layer structure. In addition, a circular diaphragm is preferably formed to the sensor chip by isotropic etching, and the pedestal is bonded by AuSi eutectic bonding to the sensor chip and subplate. In addition, the inside wall of the support for supporting the outside edge of the circular diaphragm is formed perpendicularly to a bonding surface between the sensor chip and pedestal.

Further preferably, a signal processing circuit for processing a pressure detection signal is integrated into the sensor chip. By thus forming both a diaphragm for detecting pressure and a signal processing circuit to the sensor chip, the pressure detection signal obtained from the sensor chip can be preprocessed by, for example, amplification to a signal level appropriate to processing by an external system.

By thus bonding the sensor element pedestal indirectly to the main plate with a subplate disposed therebetween, thermal stress from the system-side body to which the semiconductor pressure sensor is installed is buffered by the subplate. Thermal stress loads on the sensor chip of the sensor element are thus alleviated, and a semiconductor pressure sensor with a high failure pressure can be achieved.

Furthermore, pressure medium leakage from between the main plate and system-side body is prevented, and external forces caused by, for example, deformation of the system-side body by thermal expansion are absorbed by the O-ring filling the space between the outside wall in the thickness direction of the main plate, and a surface of the sensor mounting part opposite said outside wall. The sensor chip can thus be protected from the effects of external forces and pressure medium leakage, and can thus detect the pressure of the pressure medium with high precision.

Yet further, by forming the diaphragm of the sensor chip by means of isotropic etching, the inside wall of the support for supporting the outside edge of the circular diaphragm is formed perpendicularly to a bonding surface between the sensor chip and first silicon layer of the pedestal. As a result, durability is improved with respect to exfoliation stresses occurring at the interface between the sensor chip and pedestal when pressure is applied. The circular shape of the diaphragm also means that stres is also not concentrated at any specific part of the sensor chip. A semiconductor pressure sensor with an even higher failure pressure can therefore be achieved. The failure pressure is yet further improved in the present invention by using high bonding strength AuSi eutectic bonding to bond the sensor chip with the pedestal, and to bond the pedestal with the subplate.

Yet further, sensor chip is electrically isolated from the main plate by the glass of the pedestal as a result of the three-layer silicon-glass-silicon construction of the pedestal. Noise from the ground to the sensor chip is thus reduced, and a pressure detection signal with a high S/N ratio can be obtained.

Yet further, integrating a circuit having the functions of a regulating circuit board to the sensor chip enables the regulating circuit board to be eliminated. As a result, the size and cost of the semiconductor pressure sensor can be reduced. This also makes it more difficult for noise to pass from the grounded system-side body through the main plate to the sensor chip.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

The preferred embodiments of the present invention are described below with reference to the accompanying figures.

Embodiment 1

Figure 1:
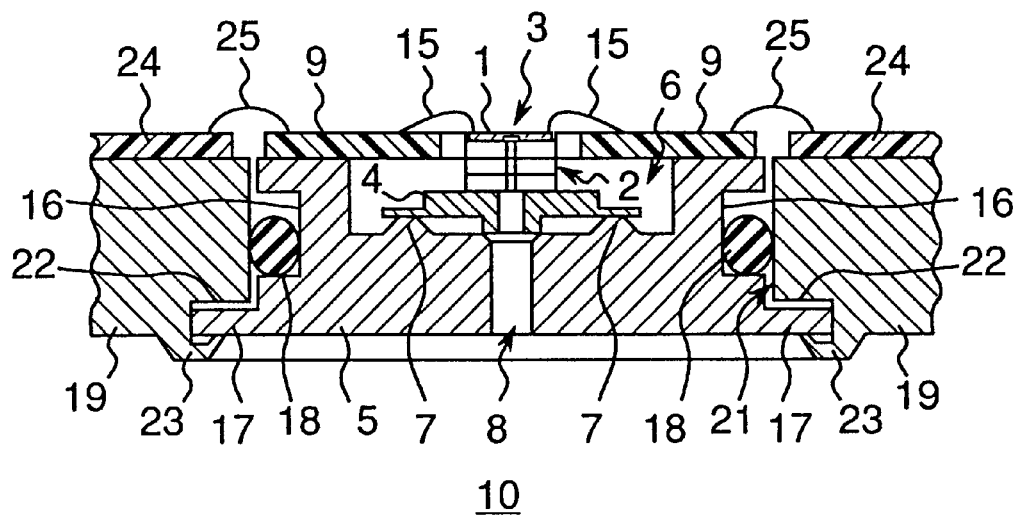
FIG. 1 is a section view showing the structure of a semiconductor pressure sensor according to a first exemplary embodiment of the present invention.

FIG. 1 is a section view showing the structure of a semiconductor pressure sensor according to a first exemplary embodiment of the present invention. As will be known from FIG. 1, this semiconductor pressure sensor 10 comprises a sensor element 3, and the sensor element 3 comprises a sensor chip 1 to which pressure from a pressure medium is applied, and a pedestal 2 to which the sensor chip 1 is bonded. The sensor element 3 is bonded to a subplate 4 at the pedestal 2, and the subplate 4 is bonded to a disk-shaped main plate 5.

Figures 2A, 2B:
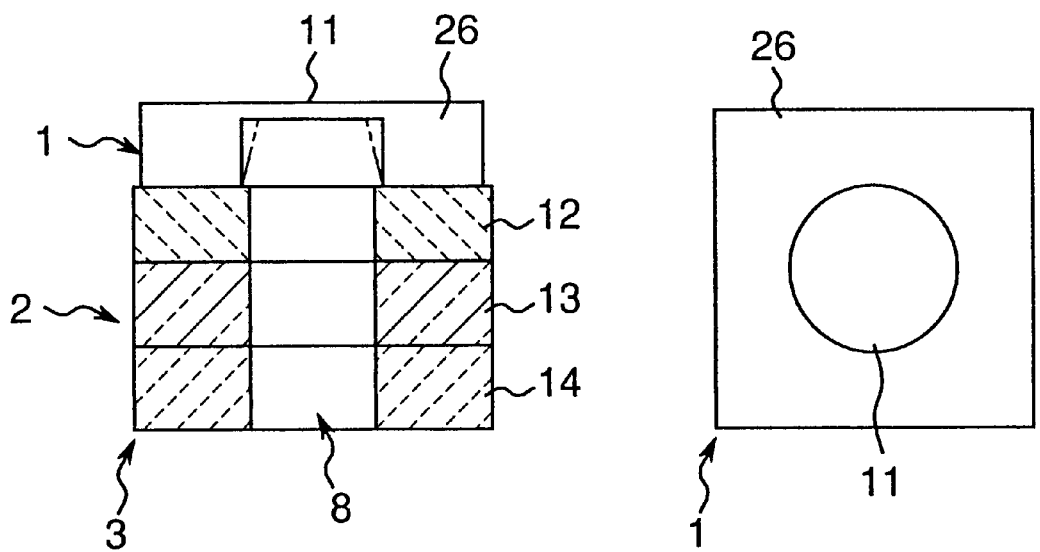
FIG. 2A is a vertical section view of the sensor element in the semiconductor pressure sensor shown in FIG. 1.
FIG. 2B is a bottom view of the sensor chip shown in FIG. 2A.

The sensor chip 1 of the sensor element 3 has a circular diaphragm 11 as shown in FIG. 2A and FIG. 2B. The sensor element 3 is a silicon single crystal in which the diaphragm 11 is formed by isotropic etching.

The sensor element pedestal 2 is formed by anodic bonding a first silicon layer 12, glass 13, and a second silicon layer 14 in that order. The sensor chip 1 is bonded to the first silicon layer 12 of the pedestal 2 by means of AuSi eutectic bonding. The subplate 4 is likewise bonded to the second silicon layer 14 of the pedestal 2 by means of Ausi eutectic bonding.

The main plate 5 to which the subplate 4 is bonded has a housing recess 6 for the sensor element 3, which deflects from one side to the other of the main plate 5, that is, through the thickness of the main plate 5. The sensor element 3 is placed in this housing recess 6, and the subplate 4 supporting the sensor element 3 is welded to an annular rib 7 projecting upward as seen in the figure from the bottom of the housing recess 6. Pressure from a pressure medium is applied to the diaphragm 11 of this sensor chip 1 through a pressure opening 8 passing through the pedestal 2, subplate 4, and main plate 5.

A regulating circuit board 9 is mounted on the main plate 5, and the regulating circuit board 9 is connected by wire 15 to the sensor chip 1. The regulating circuit board 9 comprises circuitry for processing, including amplification to a signal level suitable for processing by the system, a pressure detection signal detected by the sensor chip 1 and supplied therefrom via wire 15.

A channel 16 and flange 17 are also formed in the side wall of the main plate 5, which is oriented in the thickness direction of the main plate 5. An O-ring 18 is fit into the channel 16.

A mounting part 21 having a shoulder 22 and edge member 23 is formed in a system-side body 19 at a location enabling the pressure of a pressure medium to be detected by the semiconductor pressure sensor 10. The main plate 5 is pressed into this mounting part 21 until the flange 17 contacts the shoulder 22. The edge member 23 is then crimped to the flange 17, thereby securing the main plate 5 in the mounting part 21.

When the main plate 5 is pressed into the mounting part 21, the O-ring 18 is flexibly deformed against the side wall of the main plate 5 and the side wall of the mounting part 21 in the system-side body 19. Note that the regulating circuit board 9 and a system circuit board 24 mounted on the system-side body 19 are connected by means of wire 25.

With an exemplary semiconductor pressure sensor thus comprised according to the present embodiment, the pedestal 2 of the sensor element 3 is bonded to the main plate 5 with a subplate 4 disposed therebetween. As a result, the subplate 4 buffers thermal stress from the system-side body 19, and thus alleviates the thermal stress load on the sensor chip 1 of the sensor element 3.

Furthermore, because the diaphragm 11 of the sensor chip 1 is formed by isotropic etching instead of the anistropic etching conventionally used, the inside wall of the support 26 holding the edge of the diaphragm 11 is perpendicular to the bonded surfaces of the sensor chip 1 and first silicon layer 12 (see FIG. 2A). More specifically, this inside wall of the support 26 is not formed at an incline to said bonded surfaces (as indicated by the dot-dot-dash line in FIG. 2A) as occurs with anistropic etching. As a result, durability is improved with respect to exfoliation stresses occurring at the interface between the sensor chip 1 and first silicon layer 12 when pressure is applied. The circular shape of the diaphragm 11 also means that stres is also not concentrated at any specific part of the sensor chip 1, and the failure pressure of the diaphragm 11 is therefore significantly improved. The failure pressure is yet further improved in the present embodiment by using high bonding strength AuSi eutectic bonding to bond the sensor chip 1 with the first silicon layer 12 of the pedestal 2, and to bond the second silicon layer 14 with the subplate 4.

The main plate 5 is also typically grounded by electrical connection to the frame or chassis of, for example, the transmission of the automobile in which the semiconductor pressure sensor 10 of the present invention is installed. As described above, however, the pedestal 2 of the present embodiment is manufactured by anodically bonding a glass 13 layer between a first silicon layer 12 and second silicon layer 14, that is, the pedestal 2 features a silicon-glass-silicon construction. The sensor chip 1 is thus electrically isolated from the main plate 5 by the glass 13 layer, and noise from the ground to the sensor chip 1 is thus reduced in a semiconductor pressure sensor according to the present embodiment.

Furthermore, the O-ring 18 fills the space between the outside side wall parallel to the thickness of the main plate 5, and the opposing side wall of the mounting part 21, as described above and shown in FIG. 1. This O-ring 18 thus prevents leakage of the pressure medium from the gap between the main plate 5 and system-side body 19, absorbs such external forces as deformation of the system-side body 19 resulting from thermal expansion, and thus prevents transmission of such external forces to the sensor chip 1. As a result, the sensor chip 1 can detect the pressure of a pressure medium with high accuracy without being affected by external factors or leakage of the pressure medium.

Second Embodiment

Figure 3:
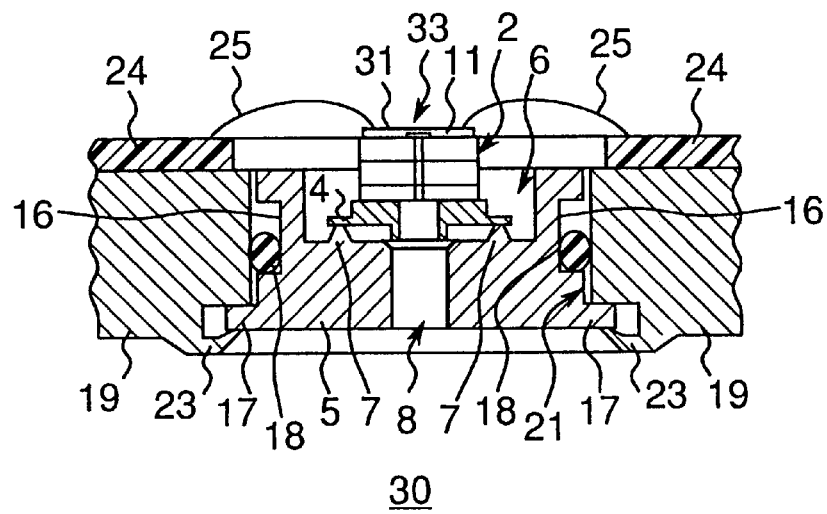
FIG. 3 is is a section view showing the structure of a semiconductor pressure sensor according to a second exemplary embodiment of the present invention.
Figure 4:
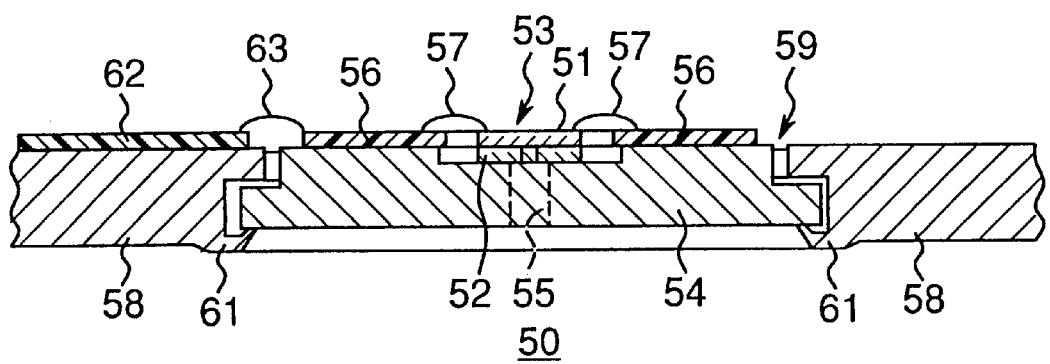
FIG. 4 is a section view showing a semiconductor pressure sensor exemplary of the prior art.
Figure 5:
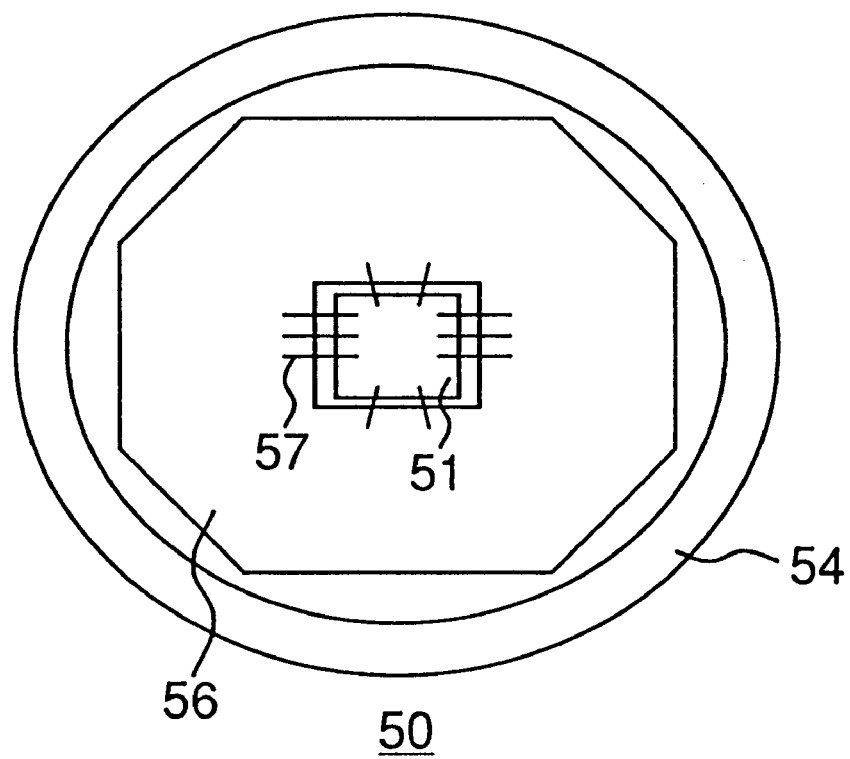
FIG. 5 is a plan view of the semiconductor pressure sensor shown in FIG. 4.

A semiconductor pressure sensor 30 according to a second embodiment of the present invention is shown in FIG. 3. This semiconductor pressure sensor 30 substitutes for the sensor chip 1 of the semiconductor pressure sensor 10 shown in FIG. 1 and FIG. 2 a sensor chip 31 integrating circuitry having the functions of the regulating circuit board 9, but is otherwise identical to the semiconductor pressure sensor of the first embodiment described above.

More specifically, this semiconductor pressure sensor 30 comprises a sensor element 33, and the sensor element 33 comprises a sensor chip 31 to which pressure from a pressure medium is applied, and a pedestal 2 to which the sensor chip 31 is bonded. The sensor element 33 is bonded to a subplate 4 at the pedestal 2, and the subplate 4 is bonded to the main plate 5.

As described above with respect to the first embodiment of the present invention, the sensor chip 31 of the sensor element 33 has a circular diaphragm 11 formed by isotropic etching, and as noted above integrates circuitry having the functions of the regulating circuit board 9 of the first embodiment of the invention.

The sensor element pedestal 2 has a three-layer structure formed by anodic bonding with a glass layer disposed between first and second silicon layers. The sensor chip 31 is bonded to the pedestal 2 by means of AuSi eutectic bonding. The pedestal 2 is also bonded to the subplate 4 by means of AuSi eutectic bonding.

The main plate 5 to which the subplate 4 is bonded has a housing recess 6 for the sensor element 33, and the subplate 4 supporting the sensor element 33 is welded to an annular rib 7 projecting upward as seen in the figure from the bottom of the housing recess 6. Pressure from a pressure medium is applied to the diaphragm 11 of this sensor chip 31 through a pressure opening 8 passing through the pedestal 2, subplate 4, and main plate 5.

As described in the first embodiment above, a channel 16 and flange 17 are formed in the side wall of the main plate 5, and an O-ring 18 is fit into the channel 16. As a result, when the main plate 5 is pressed into the mounting part 21 formed in a system-side body 19, the O-ring 18 is flexibly deformed against the side wall of the main plate 5 and the side wall of the mounting part 21, and thus forms an airtight seal between the main plate 5 and the system-side body 19. The edge member 23 is then crimped to the flange 17, thereby securing the main plate 5 in the mounting part 21. Note that the sensor chip 31 and a system circuit board 24 mounted on the system-side body 19 are connected by means of wire 25.

In addition to the benefits achieved by a semiconductor pressure sensor according to the above-described first embodiment of the present invention, integration of the functions of the regulating circuit board 9 used in the first embodiment (see FIG. 1) to the sensor chip 31 of this second embodiment enables the regulating circuit board 9 to be eliminated. As a result, the size and cost of the semiconductor pressure sensor 30 can be reduced. This also makes it more difficult for noise to pass from the grounded system-side body 19 through the main plate 5 to the sensor chip 31, and makes it possible to obtain a pressure detection signal with a high signal-to-noise ratio.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A semiconductor pressure sensor comprising:

a sensor element, including, a sensor chip to which pressure from a pressure medium is applied, and a pedestal for supporting the sensor chip;

a main plate;

a sensor mounting part; and a subplate provided between said pedestal and said main plate, wherein said sensor element is bonded to said subplate at said pedestal, said subplate is bonded to said main plate, said sensor mounting part is disposed to surround said main plate and said sensor element, and said main plate, includes, an airtightness holding means for holding an airtight seal between said main plate and said sensor mounting part and disposed where pressure of said pressure medium is detected.

2. The semiconductor pressure sensor according to claim 1, wherein said airtightness holding means comprises an O-ring fit to fill a gap between an outside wall, in a thickness direction, of said main plate, and a surface of said sensor mounting part opposite said outside wall.

3. The semiconductor pressure sensor according to claim 1, wherein said pedestal is a three-layer anodically bonded silicon-glass-silicon structure, said sensor chip has a circular diaphragm formed by isotropic etching so that an inside wall of a support for supporting an outside edge of said circular diaphragm is perpendicular to a bonding surface between said sensor chip and said pedestal, and said pedestal, sensor chip, and subplate are bonded by AuSi eutectic bonding.

4. The semiconductor pressure sensor according to claim 1, wherein a signal processing circuit for processing a pressure detection signal is integrated into said sensor chip.

5. A semiconductor pressure sensor comprising:

a sensor element, including, a sensor chip to which pressure from a pressure medium is applied, and a pedestal for supporting the sensor chip;

a main plate;

a sensor mounting part; and a subplate provided between said pedestal and said main plate, wherein said sensor element is bonded to said subplate at said pedestal, said subplate is bonded to said main plate, said sensor mounting part is disposed to surround said main plate and said sensor element, and said subplate functions to buffer thermal stress from said sensor mounting part thus alleviating thermal stress load on said sensor chip of said sensor element.

6. The semiconductor pressure sensor according to claim 5, wherein said main plate includes an airtightness holding means for holding an airtight seal between said main plate and said sensor mounting part and disposed where pressure of said pressure medium is detected.

7. The semiconductor pressure sensor according to claim 6, wherein said airtightness holding means comprises an O-ring fit to fill a gap between an outside wall, in a thickness direction, of said main plate, and a surface of said sensor mounting part opposite said outside wall.

8. The semiconductor pressure sensor according to claim 5, wherein said pedestal is a three-layer anodically bonded silicon-glass-silicon structure, said sensor chip has a circular diaphragm formed by isotropic etching so that an inside wall of a support for supporting an outside edge of said circular diaphragm is perpendicular to a bonding surface between said sensor chip and said pedestal, and said pedestal, sensor chip, and subplate are bonded by AuSi eutectic bonding.

9. The semiconductor pressure sensor according to claim 1, wherein a signal processing circuit for processing a pressure detection signal is integrated into said sensor chip.

* * * * *